Patented Nov. 3, 1953

2,657,458

UNITED STATES PATENT OFFICE 2,657,458

METHOD OF JOINING COPPER MEMBERS

Leopold Pessel, Whitemarsh, Pa., assignor to Radio Corporation of America, a corporation of Delaware No Drawing. Application January 29, 1949, Serial No. 73,664

5 Claims. (Cl. 29—360)

This invention relates generally to methods of joining metallic bodies by soldering or brazing. More specifically, it relates to improved processes of joining metallic members made of copper, or alloys consisting essentially of copper, and has particular utility where one or more of the members to be joined carries an enamel insulating coating.

Although usual methods of soldering are successful in joining bare conductors, for example, when the conductors are enameled, such as is the case with fine magnet wires, more complicated processes must be resorted to. It is, of course, possible to strip off the enamel coating mechanically and then apply solder. The mechanical stripping of the enamel, however, is a tedious and costly process where mass production of electrical equipment is involved and, for this reason, chemical methods have been sought for accomplishing this part of the process.

Previous chemical methods of stripping the insulation and, at the same time, soldering the joint, have been proposed but have various disadvantages depending upon the particular process used. One of these former methods is based upon the immersion of the joint in a lead-tin solder kept at a temperature of 900–1000° F. Sometimes a flux, such as zinc chloride, is used. The organic coating is charred and burned away and a solder joint is obtained. But the process has certain inherent disadvantages. One of these disadvantages is that fine copper wires are dissolved by the lead-tin alloy at these temperatures and, therefore, the process is restricted to relatively heavy guage wires. Even with heavier guage wires, however, there is a noticeable decrease in cross-section and the formation of tin-copper alloy may cause serious embrittlement. Also, if the conductors are too heavy, the temperature of 1000° F. is not high enough to cause instant removal of the organic coating and a rather lengthy immersion period is required with attendant deterioration of adjoining sections of the conductors. Higher temperatures are impracticable with lead-tin alloys due to the excessive oxidation of the metal and difficulties in bath and pot maintenance. In addition, if a zinc chloride flux is used, a washing operation is necessary for removal of the corrosive flux residue.

Another previously used method includes the use of a molten alloy selected from the large group of alloys known collectively as silver solders. In addition to containing silver as a predominant component, these alloys may contain copper, zinc, cadmium, or other ingredients. Since these alloys oxidize rapidly at their melting temperatures and above, a flux must be used. Since these fluxes introduce corrosive residues, the residues must be removed. Also, when fluxes, such as borax, are used, continued operation of the bath causes the flux to pick up oxides rapidly and finally the bath becomes so viscous that the flux must be removed. Silver solders, as a group, are also relatively expensive.

Still another previous brazing method is based upon the use of copper-phosphorus alloys. In these alloys, the phosphorus gradually oxidizes to phosphoric acid, which floats on top of the molten alloy as an acid slag, which has such strong fluxing properties that no other external flux is necessary. One of the disadvantages of this type of brazing alloy is that particles of the flux adhering to the joint have proved highly corrosive and may cause rapid failure to the joint if one of the members being joined is a very thin wire. It is, therefore, necessary to remove all traces of the flux with certainty. Another serious disadvantage in the use of these alloys is that, with continued operation, due to the oxidation of the phosphorus, a rise in flow point takes place, requiring a continuous increase in operating temperature and, finally, the replacement of the bath.

In contrast with the previous brazing methods, such as those described above, the improved processes of the present invention have the advantage of simplicity, ease of operation, non-corrosiveness and the production of strong joints having good conductivity. In general, the method of the present invention includes effecting physical contact between the members which are to be joined, immersing the members in a bath of molten lead maintained at a temperature of at least 1600° F. and removing the members after a short period of immersion. Certain preferred embodiments, as well as certain modifications of the present method, will be described hereinafter.

One object of the invention is to provide an improved method of joining metallic bodies, at least one of which is coated with an organic enamel.

Another object of the invention is to provide an improved method of joining wires made of copper or alloys in which copper predominates.

Another object of the invention is to provide an improved method of joining insulated metallic members without the necessity of including a special mechanical operation of removing the insulating coating before applying a solder.

Another object of the present invention is to provide an improved method of joining insulated wires without causing embrittlement or excessive corrosion.

Another object of the invention is to provide an improved method of joining wires by soldering and without introducing any corrosive flux residue during the process.

These and other objects will be more apparent and the invention will be better understood from the following detailed description.

In a preferred embodiment of the present invention, a bath of pure lead is maintained at a temperature of 1600–1650° F. A pair of enamel coated copper wires, which are to have their ends joined, are prepared for the joining process simply by twisting their respective ends together and the twisted ends are then dipped in the bath of molten lead for a few seconds. At the high temperature of the bath, lead oxide naturally forms on the surface and acts as an effective flux. The organic insulation is burned off instantly and the lead oxide fluxed surface of the copper wires is readily wetted by the molten lead. It is advantageous to perform the dipping by giving the joint two or three quick up and down motions through the lead oxide layer to induce more perfect wetting with the molten lead. This is not absolutely necessary, however, but is simply a preferred way of carrying out the method. A good film of lead forms over the joint and, upon withdrawal, there is no flux residue except lead oxide, which is absolutely inert and non-corrosive, under the operating conditions of the joint. The reason for using the particularly high temperature specified is that the fluxing action of the lead oxide does not become effective until the melting point of the oxide has been reached or exceeded, although there are some indications of fluxing action occurring somewhat below the theoretical melting point of the lead oxide. A variety of values for the melting point of lead oxide have been given in the literature. The variations may be due to the fact that lead oxide combines readily with other oxides forming lower melting mixtures. A value of 1630° F. is usually accepted as the melting temperature of lead oxide. However, because lower melting mixtures are probably formed under various operating conditions, fluxing action is sometimes observed considerably below this accepted temperature. Optimum operating temperature, however, has been found to be about 1650° F. The bath may actually be operated at higher temperatures, up to the melting point of copper (1981° F.), but there is little advantage in operating at such higher temperatures except when joining especially heavy conductors or when unusually stubborn insulating coatings must be removed from the wires.

In continued operation, there is considerable accumulation of molten lead oxide on top of the solder bath, but it has a tendency to be drawn towards the sides of the pot, leaving an area of molten metal in the center covered by a thin layer of molten oxide, which performs the fluxing. Molten lead oxide exhibits no tendency to stiffen with aging. As more and more of it accumulates on the surface of the bath, however, the excess may be removed from time to time. The absence of any aging phenomena, in the case of lead oxide, is a decided advantage in comparison with many other fluxes which stiffen rapidly by absorption of oxides from the bath, itself.

When relatively thick wires are to be joined, another embodiment of the invention may be used. Where the ends of two heavy gauge wires, at least one of which is enamel coated, are to be joined, their respective ends are first twisted together, as described in the previous example, and the twisted ends are then, preferably, dipped, first, into a powdered flux. In contrast with previous corrosive fluxes, such as fluxes of the chloride type which were previously used with molten lead baths maintained at temperatures of 570–750° F., this embodiment of the present invention includes non-corrosive high-melting point fluxes having glass-like properties. Among the fluxing materials found most suitable in this process for promoting the wetting of a copper surface with molten lead, those found particularly useful are lead borate, lead silicate, lead borosilicate, and certain glasses of the lead-alkali silicate group, such as lead potassium silicate and lead sodium borosilicate. All of these materials have in common the fact that they will dissolve oxides, such as copper oxide, while in the molten state. Thus, they act as effective fluxing agents. However, below their melting points, they are relatively inert, practically insoluble in water, non-electrolytic and absolutely non-corrosive. When using fluxes of this nature, it has been found that there is no need to remove the flux residue from the finished joint. It may be left in place without any danger of current leakage or corrosion.

When utilizing fluxes of the above-described character, somewhat lower temperatures of the lead bath may be used. However, temperatures of not less than 1200° F. should be used in order to insure proper fluidity of the flux and it is preferred to maintain the lead bath at 1400–1600° F., or even above, in order to obtain best results.

In order to cause more of the flux to adhere to the joint, the joint may first be dipped into a suitable liquid, such as water, alcohol or kerosene, before dipping into the powdered flux. The joint covered with the adhering powdered flux is then dipped into the molten metal bath.

While the joints produced by the above-described methods are of high quality, both from the standpoint of electrical conductivity and mechanical strength, the coating of metal is rather thin and, for some uses, may thus be objectionable. The thickness of the coating may be increased by dipping the lead-brazed joint into an ordinary soft solder bath. Any soft solder of the conventional type may be used, such as a tin-lead solder, containing from 20–65 per cent tin. Also, soft solders having a melting point below that of lead, but being of different composition, may be used. This additional solder layer may be desirable in the case of relatively heavy gauge conductors but is usually not necessary where at least one of the wires being joined is thin. The extra operation of using a heavy finishing layer of soft solder renders the joint more substantial mechanically but still preserves the ductile lead zone next to the copper, thus eliminating embrittlement.

The above processes may, of course, be used where at least one of the wires to be joined is enamel coated with insulating compositions, such as oleoresinous enamels, or polyvinyl acetal varnishes, or any other of the commonly used synthetic, resinous enamels, such as alkyds, glyptals, etc., all of which readily char and burn off at the temperature at which the process is carried out. Of course, the process can also be used with uninsulated wires, just as readily as it can be used with insulated wires, but the advantages of using it would not be present since, when bare wires are soldered, soft solders used at much lower temperatures are usually adequate. But in the manufacture of electrical equipment, such as transformers, inductors, motors, etc., a wide variety of types of insulated wires, of many dimensions, have to be joined. The wires are either single or stranded. The joint may have to be produced either between two insulated wires, such as so-called magnet wires, or between an insulated wire and a bare conductor. It is in manufacturing processes of this latter nature that the present invention is of great advantage since it eliminates mechanical stripping steps without introducing corrosive materials to deteriorate the joints.

Although the invention has been illustrated mainly in connection with the joining of electrical conductors, it will be understood that it is applicable to the joining of any metallic members consisting essentially of copper, and that when at least one of the members carries a coating of any organic enamel the processes of the invention are of great advantage over processes previously employed.

I claim as my invention:

1. A method of joining two metallic members consisting essentially of copper, at least one of said members having a covering of organic enamel, said method comprising placing said members in contact and immersing them in a bath of molten lead having a layer of a material comprising molten lead oxide floating thereon, to remove said enamel and flux the surfaces of said members with said lead oxide, and then removing said members from said bath with a coating of lead deposited thereon.

2. A method according to claim 1 in which said members are copper wires.

3. A method according to claim 1 in which said bath is at a temperature of at least 1600° F. but lower than the melting point of said members.

4. A method according to claim 1 in which said bath is at a temperature of about 1650° F.

5. A method according to claim 1 in which said immersion takes place by dipping said members several times in said bath.

LEOPOLD PESSEL.

References Cited in the file of this patent

UNITED STATES PATENTS

| Number | Name | Date |
|---|---|---|
| 208,674 | Daumesnil | Oct. 8, 1878 |
| 943,639 | Rockey | Dec. 14, 1909 |
| 1,029,351 | Farnham | June 11, 1912 |
| 1,110,638 | Monnot | Sept. 15, 1914 |
| 1,195,376 | McClintock | Aug. 22, 1916 |
| 1,271,320 | Houskeeper | July 2, 1918 |
| 1,651,403 | Mougey | Dec. 6, 1927 |
| 1,726,623 | Hollnagel | Sept. 3, 1929 |
| 2,346,413 | Broecker | Apr. 11, 1944 |
| 2,371,725 | Young | Mar. 20, 1945 |
| 2,373,245 | Hopkins | Apr. 10, 1945 |
| 2,390,890 | MacFarland | Dec. 11, 1945 |
| 2,446,996 | Bouton | Aug. 11, 1948 |
| 2,493,768 | Magnin | Jan. 10, 1950 |
| 2,586,142 | Bailey | Feb. 19, 1952 |

OTHER REFERENCES

Ser. No. 270,210, Holst (A. P. C.), published May 11, 1943.